July 10, 1956  R. F. RECKER  2,753,643
FISHING ARROW
Filed June 14, 1954

INVENTOR
Richard F. Recker
By Owen & Owen
ATTORNEYS

# United States Patent Office 2,753,643
Patented July 10, 1956

2,753,643
FISHING ARROW
Richard F. Recker, Ottawa, Ohio

Application June 14, 1954, Serial No. 436,375

2 Claims. (Cl. 43—6)

This invention relates to the heads of arrows used primarily for fishing, and particularly to the provision in combination with such heads of releasable barb means therefor.

The object of the invention is the provision of a novel barb means for fishing arrow heads, which means is of simple and efficient form and is operable to securely hold a speared fish while being drawn in and is then easily and quickly movable to outer position on the head to permit easy withdrawal of the head from the fish without mutilation, thus enhancing the practicability and commercial value of such arrows.

Further objects and advantages of the invention will be apparent from the following detailed description, and from the accompanying drawings illustrating one embodiment thereof, and in which Fig. 1 is a side view of a fishing arrow embodying the invention, with a part broken away and with the barb means in operative position;

Figure 1:
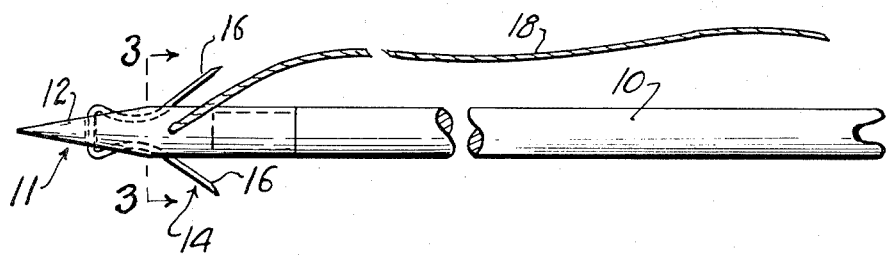

Referring to the drawings, 10 designates the shaft and 11 the head of an arrow of a type adapted for fishing, the latter tapering to a point at its free or nose end and having its inner end socketed in the form of a ferrule to receive a reduced end portion of the shaft, as is common in arrows of this character.

The head 11, which is preferably of metal, has a tapered nose portion 12 considerably longer than the shaft diameter and this portion is provided diametrically therethrough substantially midway of its length with an aperture 13 for pivotally receiving the loop or bite portion of a U-shaped barb member 14.

Figure 2:
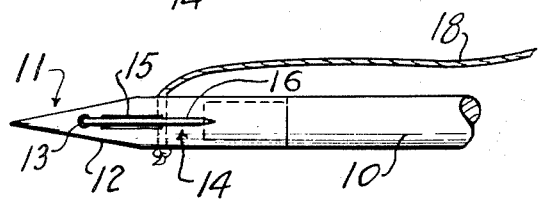
Fig. 2 is a different side view thereof, with a part of the handle broken away.

The member 14 is of spring wire-like material and has its legs bowed inwardly adacent to their inner ends to normally seat in longitudinally extending recesses 15 provided in opposite sides of the head rearwardly of and adjacent to the respective ends of the aperture 13 when such legs are projected rearwardly of the head, as in Figs. 1 and 2. The free end portions 16 of said legs flare outwardly from their bowed portions so that when seated in said recesses the leg ends provide rearwardly extending outwardly projecting barbs that prevent rearward withdrawal of the arrow head from a fish into which it is driven.

Figure 3:
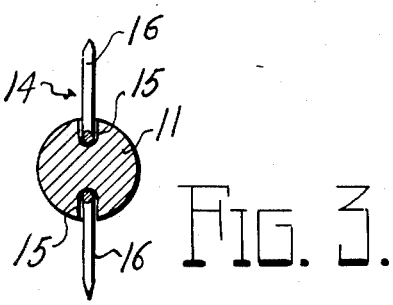
Fig. 3 is an enlarged section on the line 3—3 in Fig. 1.
Figure 4:
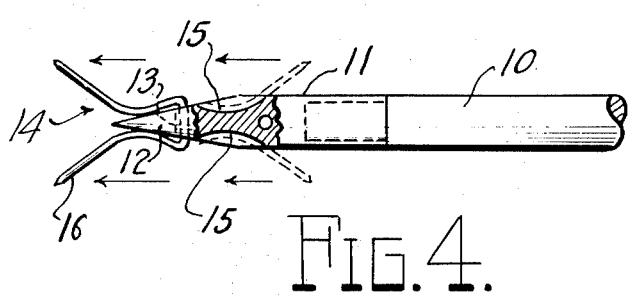
Fig. 4 is a view similar to Fig. 1, with the barb means shown in full lines as in released or inoperative position.

When the arrow and engaged fish have been retrieved by the use of the retrieve line 18 attached to the head, the arrow is forced a sufficient distance through the fish to expose the barb end 16. The barb member legs are then sprung out of the recesses 15 and the member is turned in the aperture 13 about its loop portion as a pivot so as to project the barb portions 16 of the legs forwardly of the arrow head, as in Fig. 3. This permits an easy withdrawal of the arrow from an engaged fish without tearing or mutilation.

I wish it understood that my invention is not limited to any specific construction, arrangement or form of the parts, as it is capable of numerous modifications and changes without departing from the spirit of the claims.

I claim:

1. A fishing arrow having a forwardly pointed head, said head having a diametrically extending aperture formed therethrough and longitudinally extending recesses formed therein adjacent to the ends of the aperture, together with a substantially U-shaped barb member having its looped portion pivotally mounted in said aperture and its legs extending rearwardly therefrom and seated in opposed relation in said recesses, in such a manner as to provide rearwardly extending laterally projecting barbs, the member legs being springable from said recesses to permit a swinging of the member to forwardly directed position.

2. A fishing arrow having a forwardly pointed head, said head having a diametrically extending aperture formed therethrough and longitudinally extending recesses formed therein adjacent to and in substantially the diametrical plane of said aperture, together with a substantially U-shaped barb member having its loop pivotally mounted in the aperture and its legs seating short of their ends in adjacent ones of said recesses to retain the legs in rearwardly projected positions, the terminal ends of said legs flaring outwardly and rearwardly when in said position to form barbs, the member legs being springable from said recesses to permit a forward swinging movement of the member to project its legs into forward inoperative positions.

References Cited in the file of this patent
UNITED STATES PATENTS

| 1,498,741 | Loop | June 24, 1924 |
| 2,455,784 | Lapsensohn | Dec. 7, 1948 |
| 2,599,626 | Gottschalk et al. | June 10, 1952 |

FOREIGN PATENTS

| 54,796 | Norway | Jan. 14, 1935 |